(12) United States Patent
Gaisne et al.

(10) Patent No.: US 8,690,207 B2
(45) Date of Patent: Apr. 8, 2014

(54) IMPACT ABSORBING MEMBER AND A METHOD FOR MAKING SAME

(75) Inventors: Denis Gaisne, Saint Ouen de Pontcheuil (FR); Olivier Grandsire, Epreville pres de Neubourg (FR); Jean-Philippe Leclerq, Ferrieres en Bray (FR); Odd-Perry Sovik, Boverbru (NO); Alejandro Velasquez, Oslo (NO)

(73) Assignee: Norsk Hydro ASA, Oslo (NO)

( * ) Notice: Subject to any disclaimer, the term of this patent is extended or adjusted under 35 U.S.C. 154(b) by 197 days.

(21) Appl. No.: 13/123,414

(22) PCT Filed: Dec. 3, 2009

(86) PCT No.: PCT/NO2009/000418
§ 371 (c)(1),
(2), (4) Date: Apr. 8, 2011

(87) PCT Pub. No.: WO2010/064927
PCT Pub. Date: Jun. 10, 2010

(65) Prior Publication Data
US 2011/0221214 A1   Sep. 15, 2011

(30) Foreign Application Priority Data
Dec. 4, 2008 (NO) .................................. 20085061

(51) Int. Cl.
*B60R 19/02* (2006.01)

(52) U.S. Cl.
USPC .......................................... 293/102; 293/121

(58) Field of Classification Search
USPC .......... 188/371–379; 293/102, 114, 120, 121, 293/154, 155
See application file for complete search history.

(56) References Cited

U.S. PATENT DOCUMENTS

| 5,462,325 A * | 10/1995 | Masuda et al. ................ 293/102 |
| 6,308,999 B1 * | 10/2001 | Tan et al. ..................... 293/109 |
| 6,684,505 B2 * | 2/2004 | Sundgren et al. ............ 29/897.2 |
| 8,087,706 B2 * | 1/2012 | Karlander et al. ............ 293/102 |
| 2010/0200205 A1 * | 8/2010 | Morere et al. ................ 165/180 |

FOREIGN PATENT DOCUMENTS

| DE | 202005016564 | 11/2006 |
| EP | 0687743 A1 | 12/1995 |
| EP | 1454799 A1 | 9/2004 |
| JP | 2006327248 a | 12/2006 |
| WO | WO 00/46074 | 8/2000 |
| WO | WO 2006/032767 | 3/2006 |

* cited by examiner

*Primary Examiner* — Christopher Schwartz
(74) *Attorney, Agent, or Firm* — Henry M Feiereisen LLC (57) ABSTRACT

A method for manufacturing an impact absorbing member, starting with a closed or substantially closed hollow section with a mid section and two end sections, wherein at least one the end sections is bent to form a supporting member, whereby at least one imprint is made in the part of the section to be deformed by the bending operation. The invention also relates to an improved impact absorbing member formed by a manufacturing process including bending.

12 Claims, 8 Drawing Sheets

IMPACT ABSORBING MEMBER AND A METHOD FOR MAKING SAME

CROSS-REFERENCES TO RELATED APPLICATIONS

This application is the U.S. National Stage of International Application No. PCT/NO2009/000418, filed Dec. 3, 2009, which designated the United States and has been published as International Publication No. WO 2010/064927 and which claims the priority of Norwegian Patent Application, Serial No. 20085061, filed Dec. 4, 2008, pursuant to 35 U.S.C. 119(a)-(d).

BACKGROUND OF THE INVENTION

The invention relates to an impact absorbing member that includes at last one supporting member. In particular the invention relates to a crash management system including a bumper beam and crash absorbing components in one same and single part. Further, the invention relates to a method for making same.

The principle of making an integrated bumper with crash boxes has been disclosed previously, for instance in EP 1154915 B1 and DE 20 2005 016 564 U1.

However, it has not been clearly indicated how such systems would behave during common loadcases such as low speed insurance tests and regulation requirements.

A key parameter to achieve the performances required is the way the component is formed.

SUMMARY OF THE INVENTION

The present invention has the advantage of having a geometry which makes that the system has an equivalent stiffness as a traditional crash management system (mechanical assembled between crash boxes and bumper beam) and also fits in a conventional automobile packaging. Further, the invention will represent a cost efficient solution as plural process steps related to assembly of sub-components can be avoided.

BRIEF DESCRIPTION OF THE DRAWING

In the following, the invention shall be further explained by examples and Figures where:

FIG. 8 discloses a final shape of the component in its bending zone, left side view FIG. 9 discloses section C-C after final forming of the component FIG. 10 discloses one alternative embodiment of the invention, Design B, resulting from different forming processes FIG. 11 discloses from above one right half part, of Design A, FIG. 12 discloses from above one right half part of Design B, FIG. 13 discloses from above one right half part of Design C, FIG. 14 discloses a diagram showing comparison of stiffness between the three designs shown in FIGS. 11-13, FIG. 15 discloses an alternative shape of a profile in order to include a towing function, FIG. 16 discloses a section adapted for integration of a pedestrian absorber.

Figure 1:
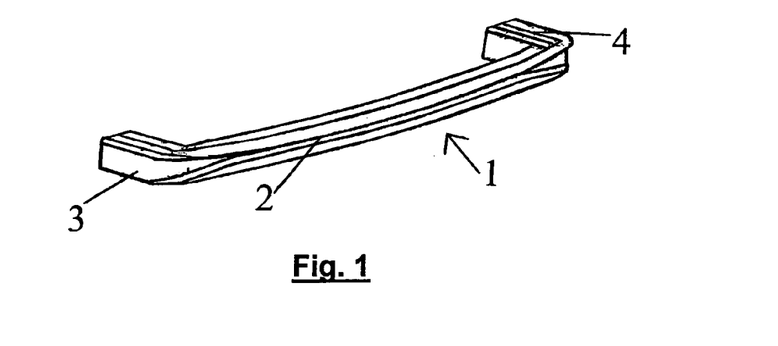
FIG. 1 discloses an impact absorbing member in accordance with the present Invention, shown in perspective, with bumper beam and crash absorbing components or crash boxes in one same and single part, FIG. 2 discloses a definition of a vehicles coordinate system, FIG. 3 discloses a cross section view of a member in accordance to the invention in the coordinate system of FIG. 2, FIG. 4 discloses an impact absorbing member in accordance with the invention, Design A1 seen from above divided into areas and indication of corresponding sections, FIG. 5 discloses shape of section after processing in section A-A FIG. 6 discloses shape of section after processing in section B-B FIG. 7 discloses deformation applied simultaneously in two walls to initiate desired shape

FIG. 1 discloses an impact absorbing member 1 in perspective, with a bumper beam 2 and crash absorbing components or crash boxes 3, 4 in one same and single part.

Figure 2:
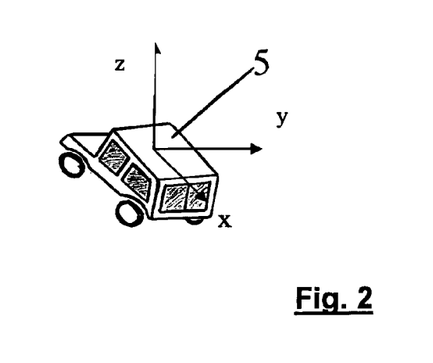
Figure 3:
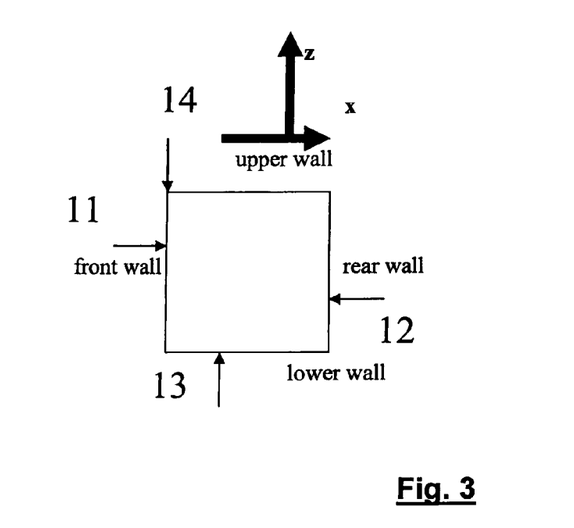

FIG. 2 discloses a definition of a vehicle's 5 coordinate system, while FIG. 3 discloses a cross section view of a section of a beam similar to that shown in FIG. 2, however with a rectangular cross section for the sake of clarity. In the figure there is shown an upper wall 14, rear wall 12, lower wall 13 and front wall 11.

Figure 4:
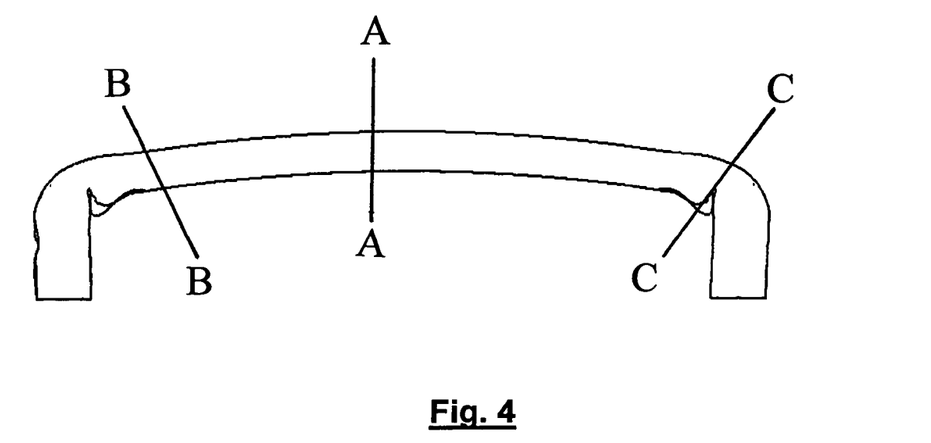

The impact absorbing member or crash management system is for practical reasons divided in areas as follows which define the following sections A-A/B-B/C-C, see. FIG. 4. The crash management system is in this embodiment symmetrical about its mid axis (where cross section A-A is allocated).

DETAILED DESCRIPTION OF PREFERRED EMBODIMENTS

Figure 5:
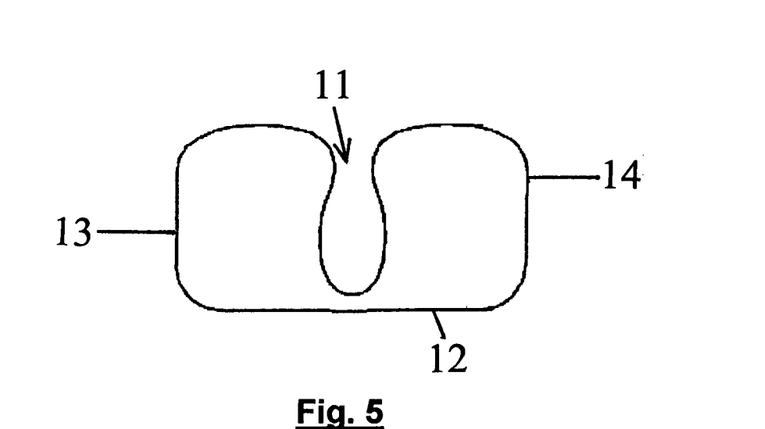
Figure 6:
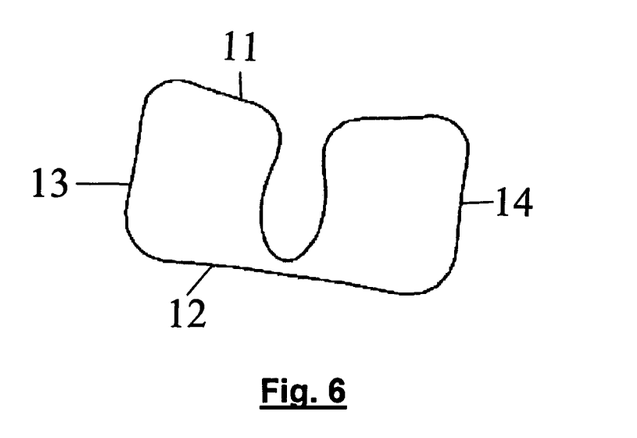

One embodiment (Design A) of manufacturing the crash management system shall be described in the following:

1. starting from a rectangular section (which could be for example an extruded profile but which can be in general a hollow section) it is performed an evolutive deformation in one of the walls so that the different sections are as shown in FIG. 5 which discloses section A-A, and FIG. 6 which discloses section B-B. As seen from this is that the wall has two crests and one bottom between them. In the FIGS. 5, 6 and 7 reference sign 11, 12, 13 and 14 relates to front wall, rear wall, lower wall, and upper wall respectively.

Figure 7:
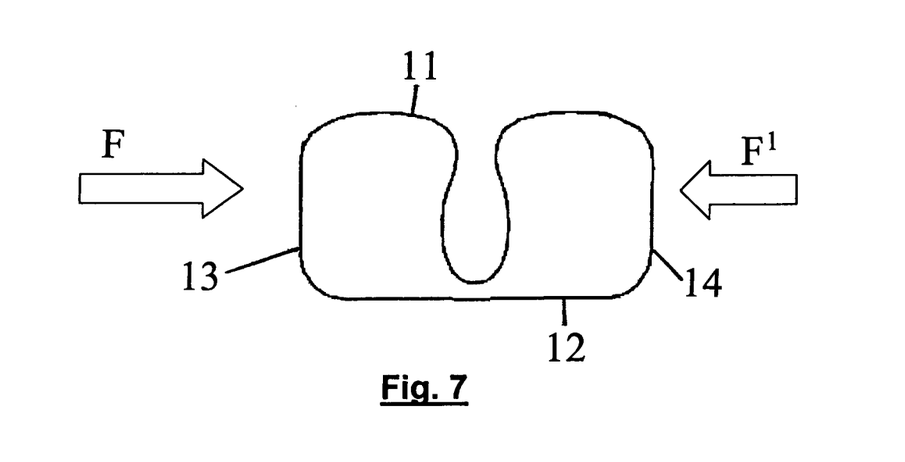
Figure 7A:
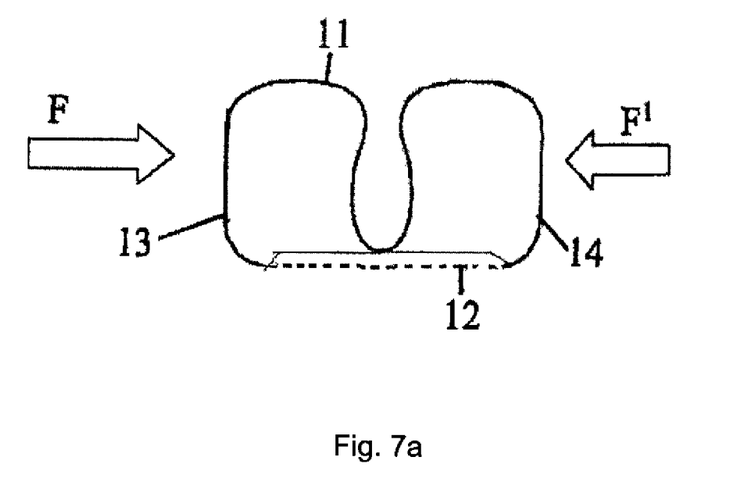
FIG. 7a shows an imprint provided in a rear wall parallel to the bending axis.

2. In a second step, it is applied simultaneously a deformation (e.g.

imprints 12) in two walls (upper wall 14 and lower wall 13, see FIG. 7) of the profile by applying a force F, F' to prepare the deformation of the profile in the bending zone. For example, as shown in FIG. 7a, imprint 12 may also be provided in a rear wall parallel to the bending axis. Thereafter a bending of the extremity of the component is performed in such a way that the final form of the component should look as in FIG. 8. See section A'. The same is applied to the other end of the profile.

Figure 9:
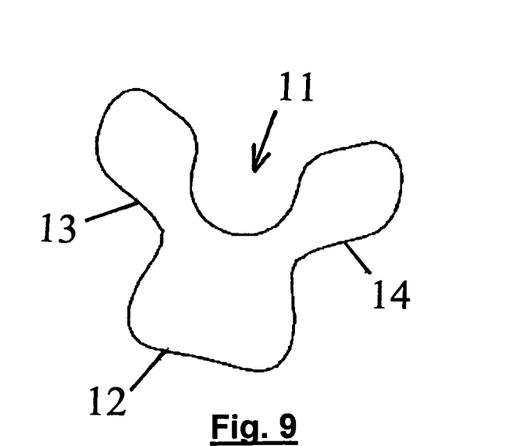

The section C-C in the bending zone of this component (see FIG. 4) could look as shown in FIG. 9. In the Figure there is shown an upper wall 14, rear wall 12, lower wall 13 and front wall 11.

Figure 8:
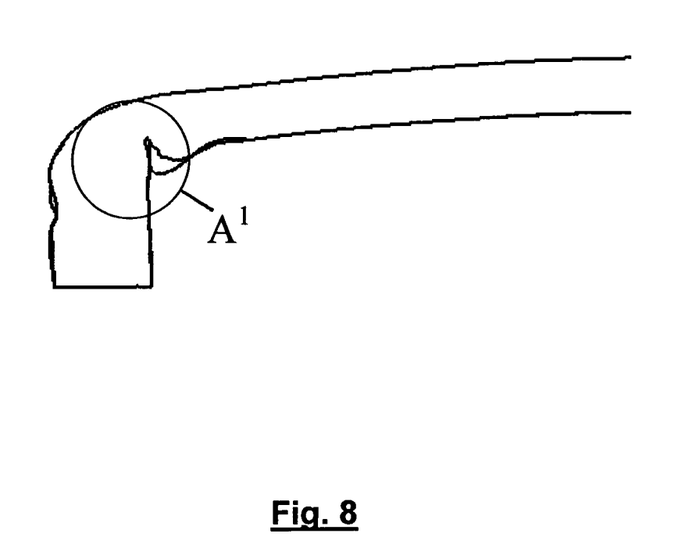

The most important point out of this final form is that in the area called A', see FIG. 8, it is ensured that the transversal section is in contact with the longitudinal section. In that manner, the system is as stiff as any other comparable solution known from prior art.

Making imprint(-s) or deformation(-s) before bending has shown to support controllable deformation of the section to be deformed during bending.

Figure 10:
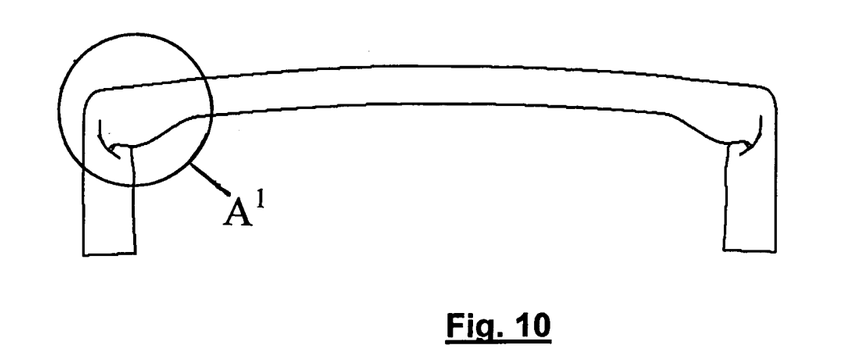

In a second embodiment (Design B) the shape of the folding could be as shown in FIG. 10. To achieve this shape, during step two of the forming in embodiment one, an imprint has to be applied in the rear wall (12) of the profile (not shown). In a subsequent step, the profile is bent while having a mandrel inside.

The most important point out of the final shape is that in the area called A', it is ensured that the transversal section, along axis X, is in contact with the longitudinal section along axis Y. In that manner, the system can be as stiff as any other similar solution known from prior art.

In the bending processes shown in the embodiments above, at least a part of the section that is deformed during bending can be clamped or arrested in a direction perpendicular to the plane of bending. This will influence the folding of said section and also limit the vertical extension of the absorbing member in this area.

Figure 11:
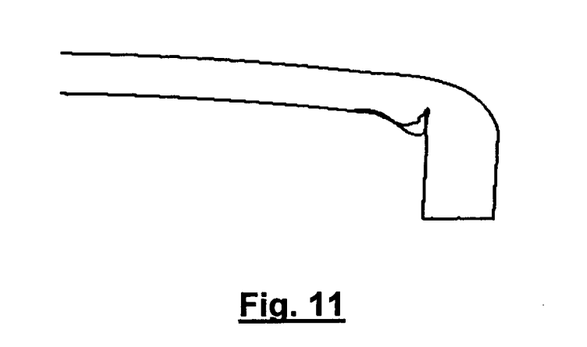
Figure 12:
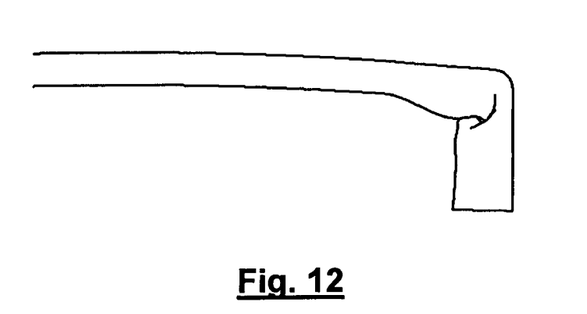
Figure 13:
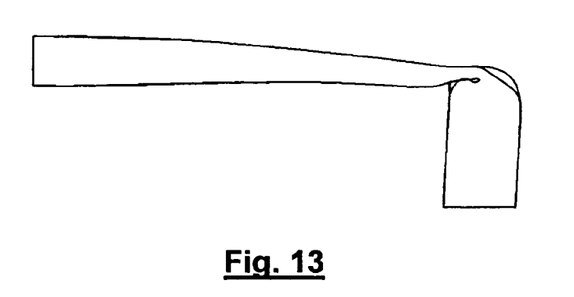

It is important to emphasize that the way in which the bending process of the system is done will have a very important influence on the stiffness on the system as shown by the The FIGS. 11, 12, 13, correspond to embodiment 1 (Design A), embodiment 2 (Design B) and designs where simple bending is done (Design C) respectively.

One important parameter in bumper system design is the stiffness of the system. This can be assessed by applying a displacement in the middle section of the system and calculate the force opposed by the system. The higher the force is, the stiffer the system is.

Figure 14:
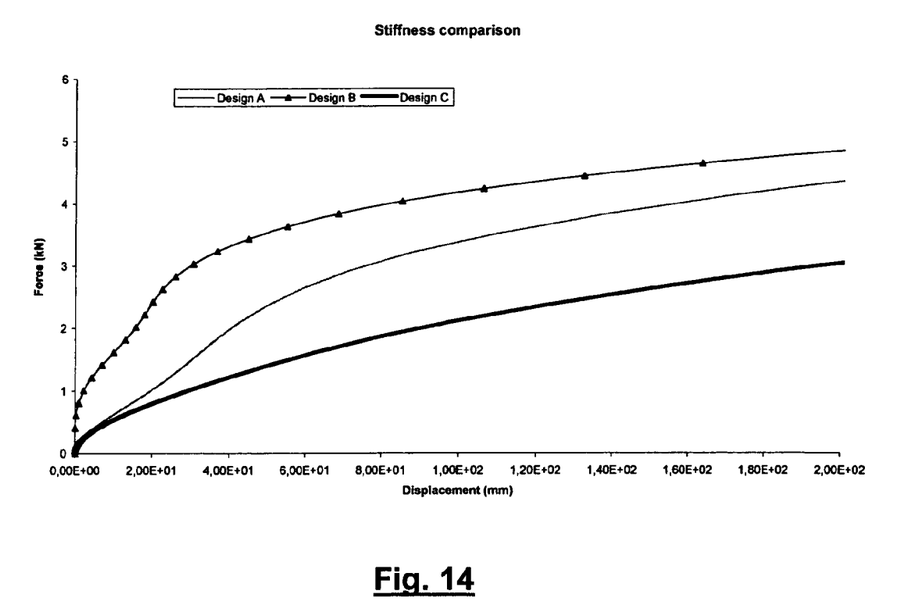

In FIG. 14, the stiffness of the three systems is compared. From this result we can see that for example at 100 mm displacement in the middle section, Design A opposes a force of 3.4 kN whereas Design B opposes a force of 4.1 kN, and whereas Design C opposes a force of 2.1 kN. ThCis we show that an increase of 95% can be achieved by applying the forming in accordance with the present invention compared to a simple bending.

Figure 15:
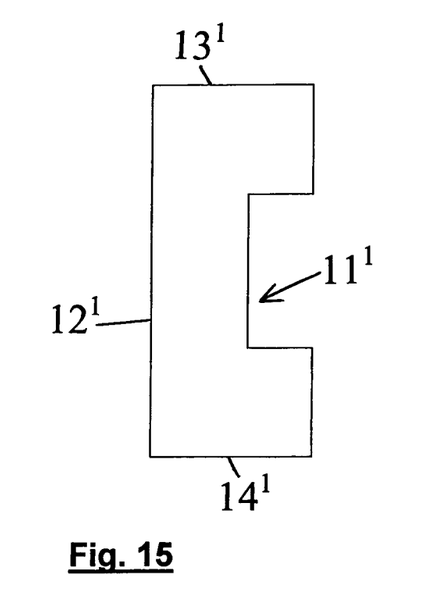

In a further embodiment, one could think to optimize the shape of the profile in order to improve the integration of a towing function. Such a cross sectional shape is shown in FIG. 15.

In the Figure there is shown an upper wall 14', rear wall 12', lower wall 13' and front wall 11'.

In this version, the groove in the profile can be used in order to give better support to a towing function (towing bracket, not shown) since the contact surface is improved.

Figure 16:
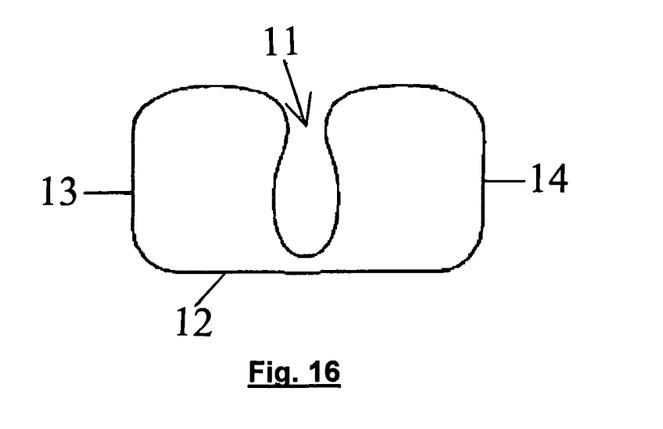

In a still further embodiment, one could think to integrate a pedestrian function taking profit of the shape of the section A-A, see FIG. 16.

In the Figure there is shown an upper wall 14, rear wall 12, lower wall 13 and front wall 11.

Indeed, in this section one can "hide" the material coming from a pedestrian absorber in such a way that, during its deformation, the material from pedestrian absorber does not add an incompressible.

Preferably the crash management system is made out of aluminium or an Al-alloy, in particular age hardening alloys of 6xxx, for instance AA6060 or 7xxx alloys such as AA7003.

The invention shows the following advantages:
reduction of components
reduction of assembly operations
function integration

The invention claimed is:

1. An impact absorbing member, comprising a substantially closed hollow section of a rectangular cross section having a mid section and two end sections, wherein at least one end section is bent to define a deformation zone and thereby form a supporting member, wherein at least one imprint is made in a member selected from the group of the mid section and the end sections before the one end section is deformed by the bending operation, wherein the one end section is clamped or arrested in a direction perpendicular to a plane of bending, wherein a surface of the hollow section, before undergoing the bending operation, is processed substantially in its mid section area to a cross section where one wall has two crests and one bottom between them, wherein the surface faces outwards in the bending operation.

2. An impact absorbing member in accordance with claim 1, wherein it is made out of aluminium or an aluminium alloy.

3. An impact absorbing member in accordance with claim 2, wherein the hollow section is made out of an AA6060 alloy.

4. An impact absorbing member in accordance with claim 3, wherein the hollow section is made out of an AA7003 alloy.

5. An impact absorbing member in accordance with claim 1, wherein the deformation zone defines an upper wall and a lower wall which are spaced at a distance is not greater than a distance between said upper and lower walls in an unaffected part of the hollow section.

6. An impact absorbing member in accordance with claim 1, wherein the supporting member is connected to a corresponding structure by insertion.

7. An impact absorbing member in accordance with claim 1, wherein the supporting member is connected to a corresponding structure by means of a plate welded to it.

8. An impact absorbing member in accordance with claim 1, wherein the other one of the end sections is bent to form a supporting member.

9. An impact absorbing member in accordance with claim 1, wherein the hollow section has at least partly a cross section where one wall has two rectangular shaped protrusions with one planar bottom between them.

10. An impact absorbing member in accordance with claim 1, wherein the hollow section in the deformation zone has a stiffness which is similar to a stiffness of an unaffected part of the hollow section.

11. A method for manufacturing an impact absorbing member, starting with a closed or substantially closed hollow section of a rectangular cross section with a mid section and two end sections, wherein at least one of the end sections undergoes a bending operation to form a supporting member, wherein at least one imprint is made in a member selected from the group of the mid section and the end sections before the one end section is deformed by the bending operation, wherein the one end section is clamped or arrested in a direction perpendicular to a plane of bending, wherein a surface of the hollow section, before undergoing the bending operation, is processed substantially in its mid section area to a cross section where one wall has two crests and one bottom between them, wherein the surface faces outwards in the bending operation.

12. A method in accordance with claim 11, wherein a mandrel is entered into the one end section during the bending operation.

* * * * *

UNITED STATES PATENT AND TRADEMARK OFFICE
CERTIFICATE OF CORRECTION

PATENT NO. : 8,690,207 B2
APPLICATION NO. : 13/123414
DATED : April 8, 2014
INVENTOR(S) : Denis Gaisne et al.

Page 1 of 1

It is certified that error appears in the above-identified patent and that said Letters Patent is hereby corrected as shown below:

In the Specification

Column 3, line 39: Please change "ThCis" to –Thus–.

In the Claims

Column 4, claim 5, line 27: Please change "distance is not greater" to –distance not greater–.

Signed and Sealed this
Fifteenth Day of July, 2014

Michelle K. Lee
*Deputy Director of the United States Patent and Trademark Office*